(12) United States Patent
Hsieh

(10) Patent No.: US 6,236,677 B1
(45) Date of Patent: May 22, 2001

(54) MODEM OPERATING WITH CENTRAL OFFICE CLOCK

(76) Inventor: Ming Chih Hsieh, 19256 Belwood Dr., Saratoga, CA (US) 95070

( * ) Notice: Subject to any disclaimer, the term of this patent is extended or adjusted under 35 U.S.C. 154(b) by 0 days.

(21) Appl. No.: 09/184,557

(22) Filed: Nov. 2, 1998

(51) Int. Cl.[7] ................................. H04B 1/38; H04L 5/16
(52) U.S. Cl. .......................................... 375/222; 375/220
(58) Field of Search ........................... 375/222, 220–355, 375/356; 370/276

(56) References Cited

U.S. PATENT DOCUMENTS

| | | | |
|---|---|---|---|
| 5,463,616 | * 10/1995 | Kruse et al. | 370/276 |
| 5,778,022 | * 7/1998 | Walley | 375/152 |
| 5,802,153 | * 9/1998 | Sridhar et al. | 375/220 |
| 5,892,792 | * 4/1999 | Walley | 375/152 |
| 6,094,452 | * 7/2000 | Gelblum et al. | 375/222 |
| 6,104,730 | * 8/2000 | Marks | 370/523 |

* cited by examiner

*Primary Examiner*—Stephen Chin
*Assistant Examiner*—Lenny Jiang
(74) *Attorney, Agent, or Firm*—Robert Samuel Smith

(57) ABSTRACT

A system for enabling a host computer connected to a central station by a PSTN line to communicate with a second host computer or an Internet Service Provider (ISP) at a rate of 56 kilobytes per second. The system and hosts are operated using PCM-AM modulation. In one embodiment, where the central station is connected by a digital (T-1), to an ISP, the central station has a transmit clock and a receive clock that is slave to the transmit clock of the central station. A receiving section of the host has a clock synchronized with the transmit clock of the central station and the transmit clock of the host is synchronized with the receiving clock of the host. In another embodiment, communication of each host is conducted through PSTN lines to through a central station. The receivers and transmitter of both hosts are controlled by four clocks all synchronized to the first transmitter clock to initiate communication.

15 Claims, 18 Drawing Sheets

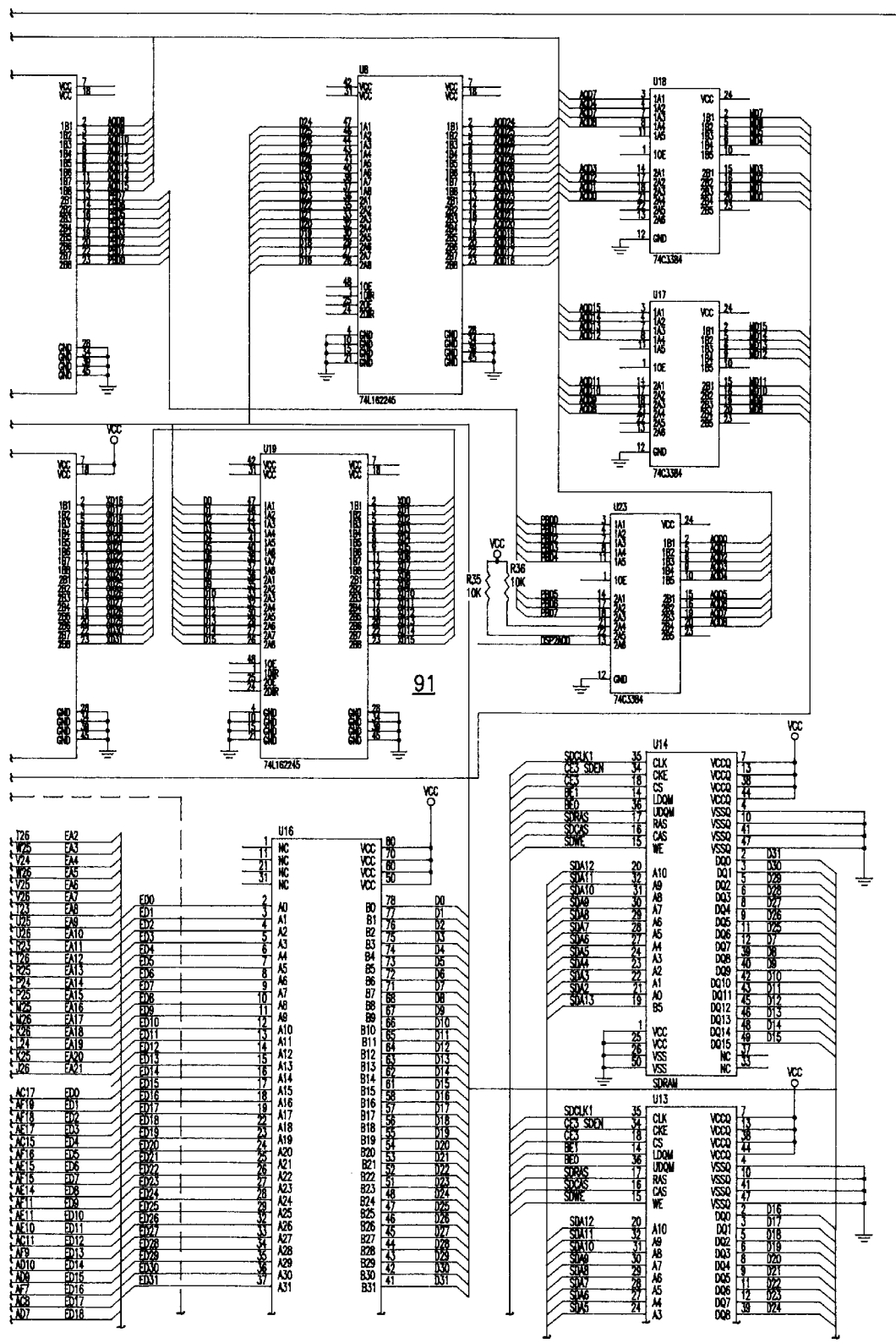
FIG. 9-I

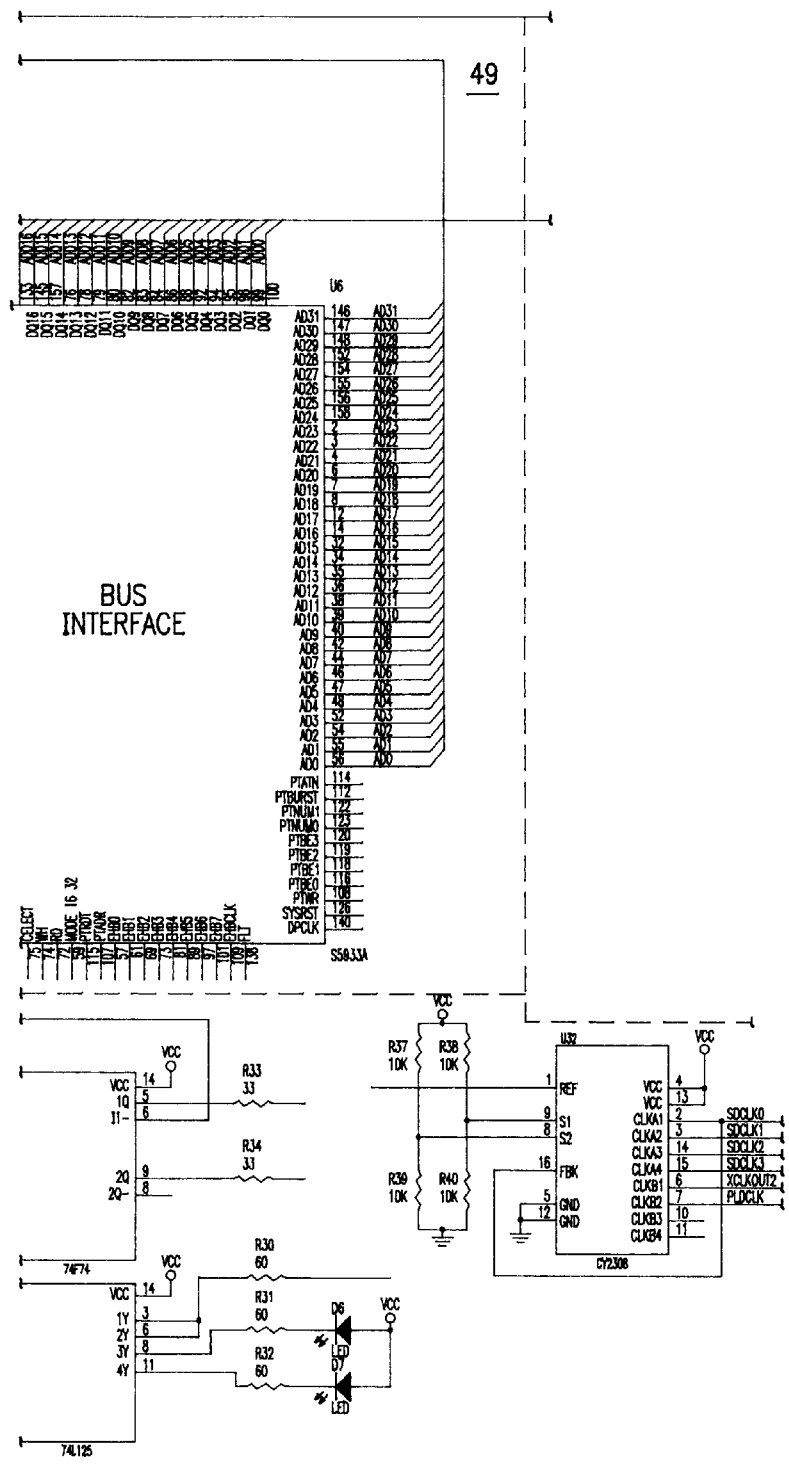
FIG. 11-I

US 6,236,677 B1

MODEM OPERATING WITH CENTRAL OFFICE CLOCK

FIELD OF THE INVENTION

This invention relates to a modem system performing full duplex PCM-AM transmission and particularly to a system that uses clock feedback from the central station to synchronize data transmission in the sending mode.

INFORMATION DISCLOSURE AND PRIOR ART

The motivation for improved modem technology originates from the requirement for greater and greater speed in the transmission of data and ability to receive data. The present state of the art system operating with modems utilizes quadrature phase modulation at a bit rate of 33.6 kbs.

FIG. 1 is a schematic diagram of a system that is the current standard in the market place for transmission between two hosts wherein each host is a computer. There is shown a first host 10 having a transmitter section 12 and a receiver section 14 communicating with the receiver section 26 and transmitter section 25 of a second host 28 through a first central station 22A coupled to a second central station 22B by digital lines (T-1) 23. Digital signals from the user-transmitter 12 are converted to a QAM signal (quadrature amplitude modulation) by D/A 16 A (digital-analog converter) and coupled by hybrid transformer 18 to hybrid transformer 20A at the first central Office 22A that is local to host 10. An A/D converter 24A converts the analog signal to digital signal and transmits the digital signal to the D/A converter 21B of the second central office 22B that is local to host 28. Transmission of signals from host 28 back to host 10 occurs in a complimentary manner from transmitting section 25 of the second host through D/A converter 16B back through the central stations 22A and 22B to the receiving section 14 of first host 10.

The rate of data transmission is limited by the bandwidth of the analog PSTN connection (telephone line) between the hosts and the respective central stations and the use of full duplex QAM (quadrature-amplitude-modulation).

In another arrangement of the prior art, the second host is an ISP (internet server provider) and the ISP is connected to its local central station by a digital (T-1) line. The first host is a computer connected to its local central station by a PSTN (analog) line. Using full duplex QAM transmission, the data rate is limited by the PSTN line to 33.5 kbs.

In a white paper published over the Internet by the Rockwell Corporation, there was disclosed a system wherein a host computer received data from an ISP (digital) host using PCM-AM transmission and synchronizing the receiver clock with the clock of the central station. . Data was transmitted from the computer back to the ISP at 33.5 kbs using QAM.

SUMMARY

An object of this invention is to provide a system that exchanges digital data with a remote host at an overall rate that is faster than can be achieved with present state of the art systems including the Rockwell arrangement. This object includes the object of transmitting and receiving data using a full duplex mode at a rate of 56 kbs.

The rate of 56 kilobits/sec represents the maximum bit rate that can be transmitted through a PSTN line using PCM-AM format. The PCM-AM signal is an analog signal having 256 levels wherein each level represents the value of one byte (eight bits).

This invention is directed toward a first host and a second host communicating through a central office. At least one of the hosts is connected to the central station through a PSTN line. Communication takes place at 56,000 kbs utilizing full duplex PCM-AM modulation. Simultaneous transmission and reception takes place at both hosts utilizing the same bandwidth. This is achieved according to the invention by:

using negative feed back at the host receiving section to cancel reflection of the transmitted signal.

synchronizing the transmit and receive clocks to one another of each host and to the transmit and receive clocks of the other host.

When one of the hosts is connected to the station through a T-1 (digital) connection, then, according to the invention, the central station is provided with a D/A converter and A/D converter, each with a clock for timing sampling and these clocks are synchronized with the clocks of the host connected to the central station through a PSTN line.

The major challenge is for the receiver to determine which received sample value corresponds to the sample time clocked by the central office station. To do this, the host-receiver section is provided with a receiver clock that is synchronized with a station office clock-and a transmitter clock that is slave to the user receive clock. Synchronizing is accomplished in two steps. In the first step the frequency of the receiver clock is adjusted to equal the frequency of the central office clock In the second step, the phase of user receiver clock pulse is adjusted to zero with respect to the clock pulse received from the central station.

DISCUSSION OF PREFERRED MODES

Figure 2:
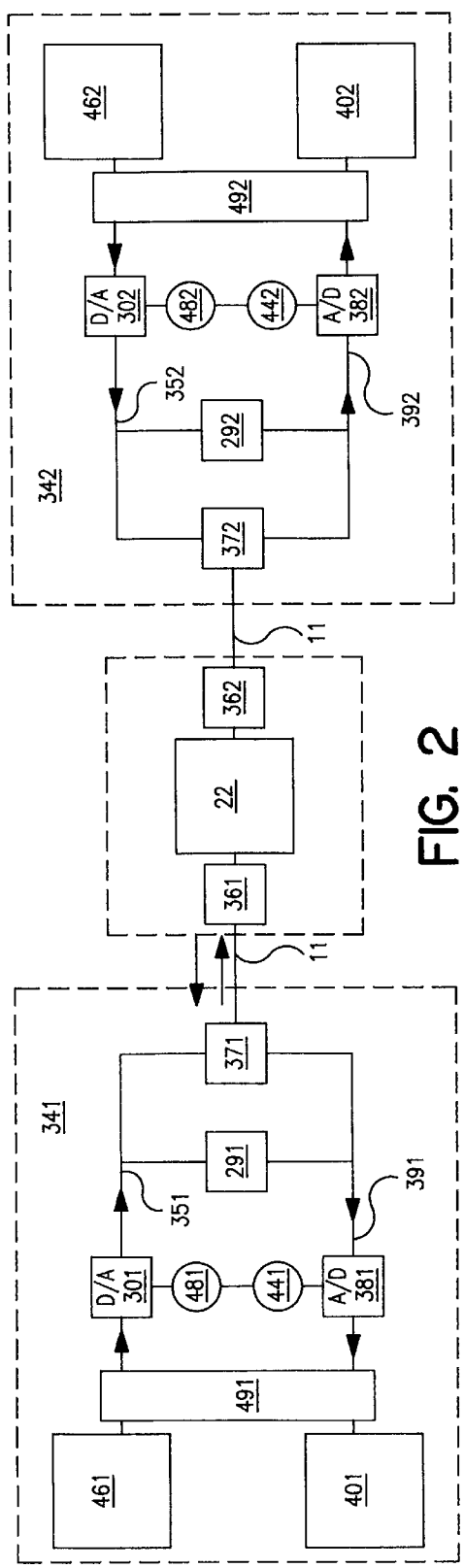

Turning now to a discussion of the drawings, FIG. 2 is a block diagram of one embodiment illustrating principles of the invention. There are shown a first host 341 , a central station 22 and a second host 342. Both first host and second host each have a transmitter section 461 and 462 respectively for generating a digital signal and a receiver section 401 and 402 respectively for receiving digital signals. Typically, sections 461 and 401 comprise a computer. Buses 491 and 492 are shown for connecting to the respective receiving and transmitting sections of hosts 341 and 342.

In order to transmit the digital signal through the PSTN line 11 to the central station, the digital signal from the respective transmit section 461 or 462 is applied to a D/A converter 301 or 302 of the respective host so that the digital signal is converted to an analog signal according to PCM-AM format and transmitted to the central station 22 through DAA (data access arrangement) 371 and 372 at the respective hosts and hybrid transformers 361 and 362 respectively.

In order to receive the digital signal at the respective receiver section 401 or 402, the analog (PCM-AM) signal from the central station 22 through the PSTN line 11 is applied to an A/D converter 381 or 382 of the respective host so that the analog signal is converted back to the original digital signal and received by the receiving section 401 or 402 of the receiving host.

Each host has a transmit clock 481 or 482 respectively which clocks the rate of D/A conversion and each host has a receive clock 441 or 442 respectively which clocks the rate of A/D conversion.

The system of FIG. 2 is designed to operate in the full duplex mode meaning that the user stations send and receive signals to and from the central station simultaneously. Both send and receive signals are sent in the same bandwidth range (typically 4 khz) of the PSTN line 11 at the maximum bit rate. This rate is 56 kbs according to the well known Nyquist theorem. This is accomplished, according to the invention, by satisfying two conditions.

One condition is that reflected transmitted signals from the user are cancelled at the user receiver station by a feedback loop 291 or 292, respectively, between the host-transmitter output terminal 351 or 352 and the host-receiver input terminal 391 or 392 respectively.

The second condition required for PCM-AM transmission between the user station 341 or 342 and central station 22 is that the transmit clocks 481 and 482, and receive clocks 441 and 442 of both hosts (four clocks) are all synchronized with one another both in frequency and phase. This is accomplished according to the invention by: the transmit clock and receive of each host being synchronized with respect to both frequency and phase and by enabling the initiating transmit clock (i.e., the first host to send a signal to the second host) to become the master of the receiving clock of the second host.

In summary, a first host communicates with a second host at 56 kbs full duplex mode through PSTN lines connecting both hosts to a central station.

Figure 3:
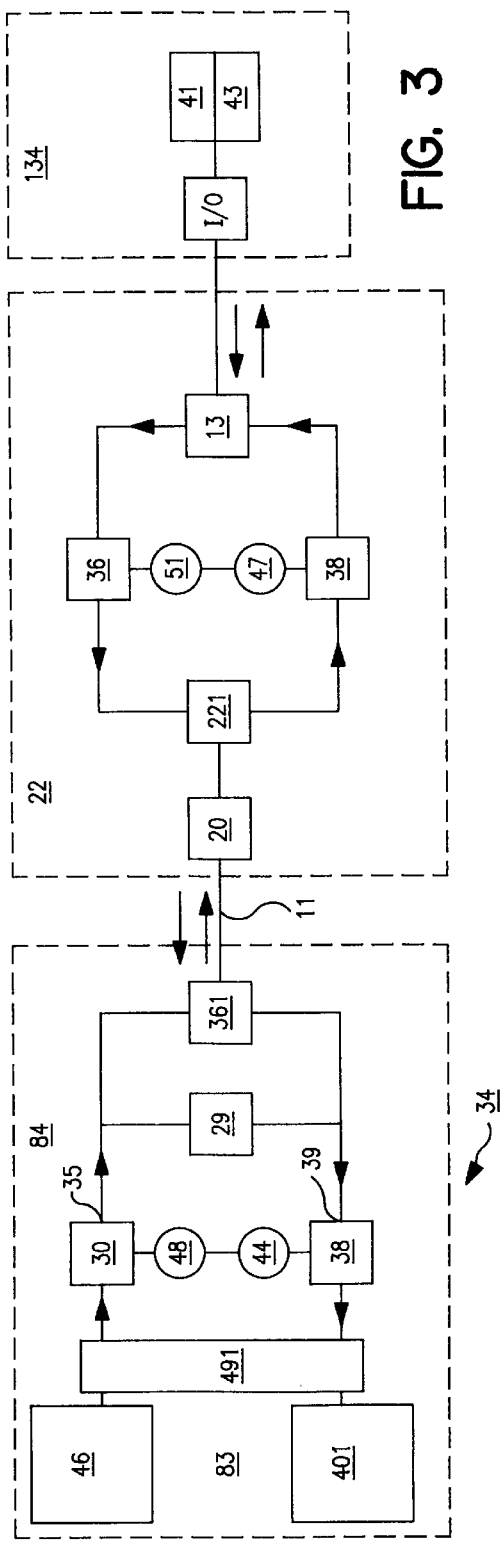
FIG. 3 shows one host connected to a central station through a PSTN connection and another host connected to the central station through a digital T-1 connection.

FIG. 3 shows a second embodiment which applies to a case where a first host 34 includes a computer section 83 connected by bus 49 to a modem section 84 and communicates with a second host 134. The first host 34 is connected to a central station 22 through a PSTN line 11 having a limited bandwidth. Communication between the central station 22 and the first host 34 takes place in PCM-AM (analog) mode The second host 134 is connected to the central station 22 by a T-1 connection 13 for transmitting digital signals. Communication between the central station and the second host 134 takes place in PCM (digital) mode The first host 34 has a transmitter section 46 for generating a digital signal and a receiver section 40 for receiving digital signals, typically, transmitter section together with receiver section 40 is a computer connected through bus 49 to the rest of the system. Digital signals from transmitter section 46 of the first host are converted to PCM-AM (analog) signal by D/A converter 30 and transmitted through DAA 371 for transmission to the central station 22. Analog signals received from the central station through hybrid transformer 361 are converted to digital signals by A/D converter 38 and transmitted to host receiver section 40.

The second host 134 is a server well known in the art and having a transmitter section 41 for generating digital signals and a receiver section 43 for receiving digital signals.

Signals between the second host 134 and the central station 22 are transmitted through a T-1 (digital) channel 13.

Central station 22 has the well known switching circuits 221. According to the invention, central station 22 also has a D/A converter 36 for converting digital signals from second host 134 to PCM-AM format. The analog signal is transmitted through hybrid transformers 20 over PSTN line 11 and through DAA 371 to A/D converter 38 where the signal is converted to original digital form and received by first host receiving section 40.

The central station 22 has a A/D converter 38 for converting PCM-AM (analog) signals from first host 34 to PCM (digital) for transmission through the T-1 (digital) channel to receiver section 43 of second host 134.

The first host 34 has a first transmit clock 48 for timing the signals through host D/A converter 30 and a first receive clock 44 for timing the signals through host A/D converter 38. The central station 22 has a central transmit clock 51 for timing central station D/A converter 36 and a central receiver clock 47 for timing central A/D converter 38.

As in the the embodiment of FIG. 2, in order for the system to operate a bit rate of 56 kb/s in full duplex mode, the embodiment of FIG. 3 must satisfy two conditions:

One condition is that reflected transmitted signals from the first host must be cancelled at the first host receiver station by a feedback loop 29 between the host-transmitter output terminal 35 and the host-receiver input terminal 39.

The second condition is that the transmit clock 48 and the receive clock 45 of the host 34 and receive clock 48 and transmit clock 51 of the central station are all synchronized with one another both in frequency and phase. This is accomplished according to the invention by: the transmit clock 171 and receive clock 44 of the host 34 and the transmit clock 51 and receive clock 47 of the central station 22 all being synchronized with respect to both frequency and phase and by enslaving the receive clock 44 of host 34 to the transmit clock 36 of the central station 22.

Figure 1:
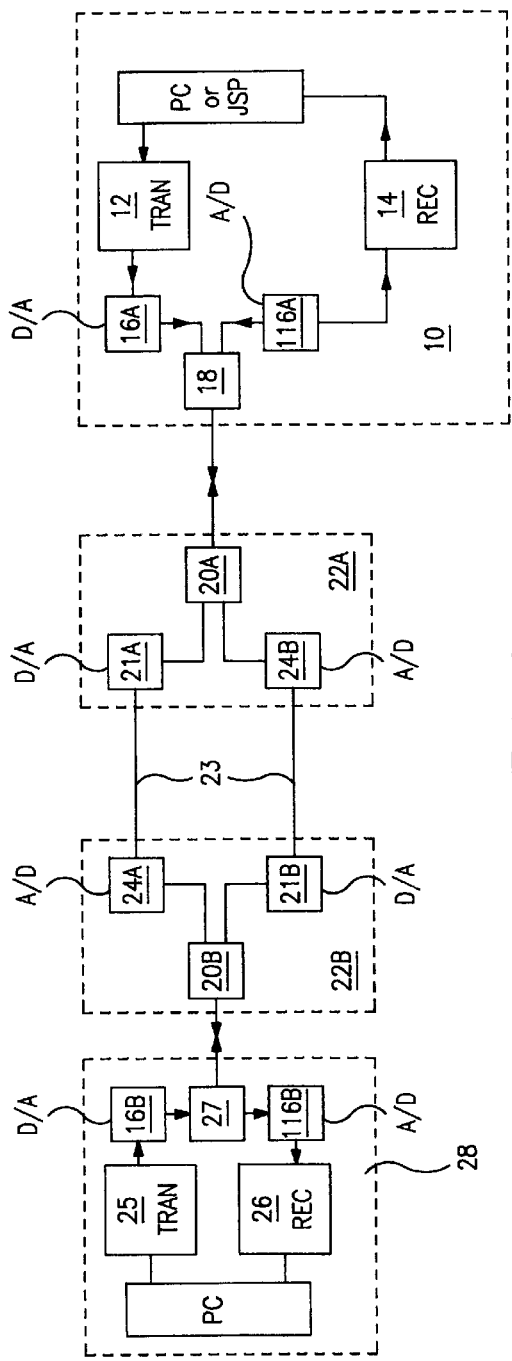
FIG. 1 is a schematic diagram of the method for transmitting/receiving data using 33.6 kbs/56 kbs frequencies according to the prior art FIG. 2 a schematic diagram of the method for transmitting/receiving data using 56 kbs for both transmit and receive according to the invention.
Figure 5:
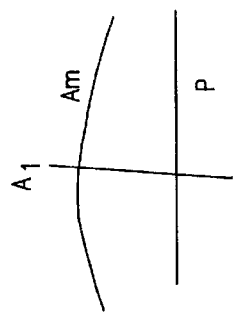
FIG. 5 shows the variation of measurement of the clock bits as a function of phase difference between clock bits of from the central station and the modem receiver.
Figure 4:
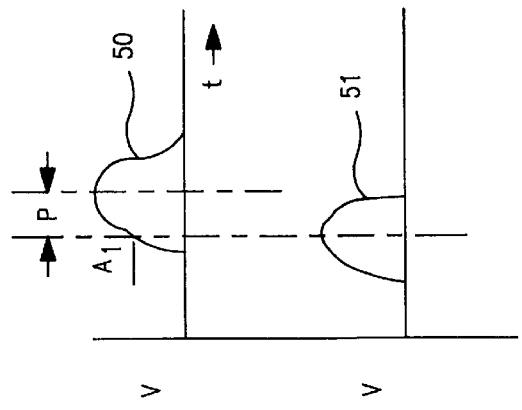
FIG. 4 shows bit shift of the modem receiving clock bits vs. the central station clock bits.

FIG. 4 illustrates the principle of the invention that is applied to eliminating the phase difference P between the clock signal 60 from the central station and the host-receive clock 61. There are shown on the same time scale plots of the amplitude, $V_A$, of the incoming clock signal 60 and $V_B$, the amplitude of the host-receive clock 44. Comparison of the graphs shows a bit shift in phase by an amount P. According to the embodiment of the invention, the amplitude, $A_1$, of the incoming central office clock signal is measured precisely when the host-receiver clock pulse is maximum. FIG. 5 shows the dependence of amplitude $A_1$ on phase shift P. According to the invention, the phase of the modem receiver bit is shifted so that a maximum value 50 of the amplitude of the incoming central office clock bit occurs simultaneously with the maximum of user-receiver-clock pulse. This is accomplished by noting the direction (positive or negative) of change of the amplitude, $A_1$, as phase,P. is changed. If the direction of shift of amplitude of $A_1$ is positive, then it is determined that the change of P is in the right direction.

Figure 6:
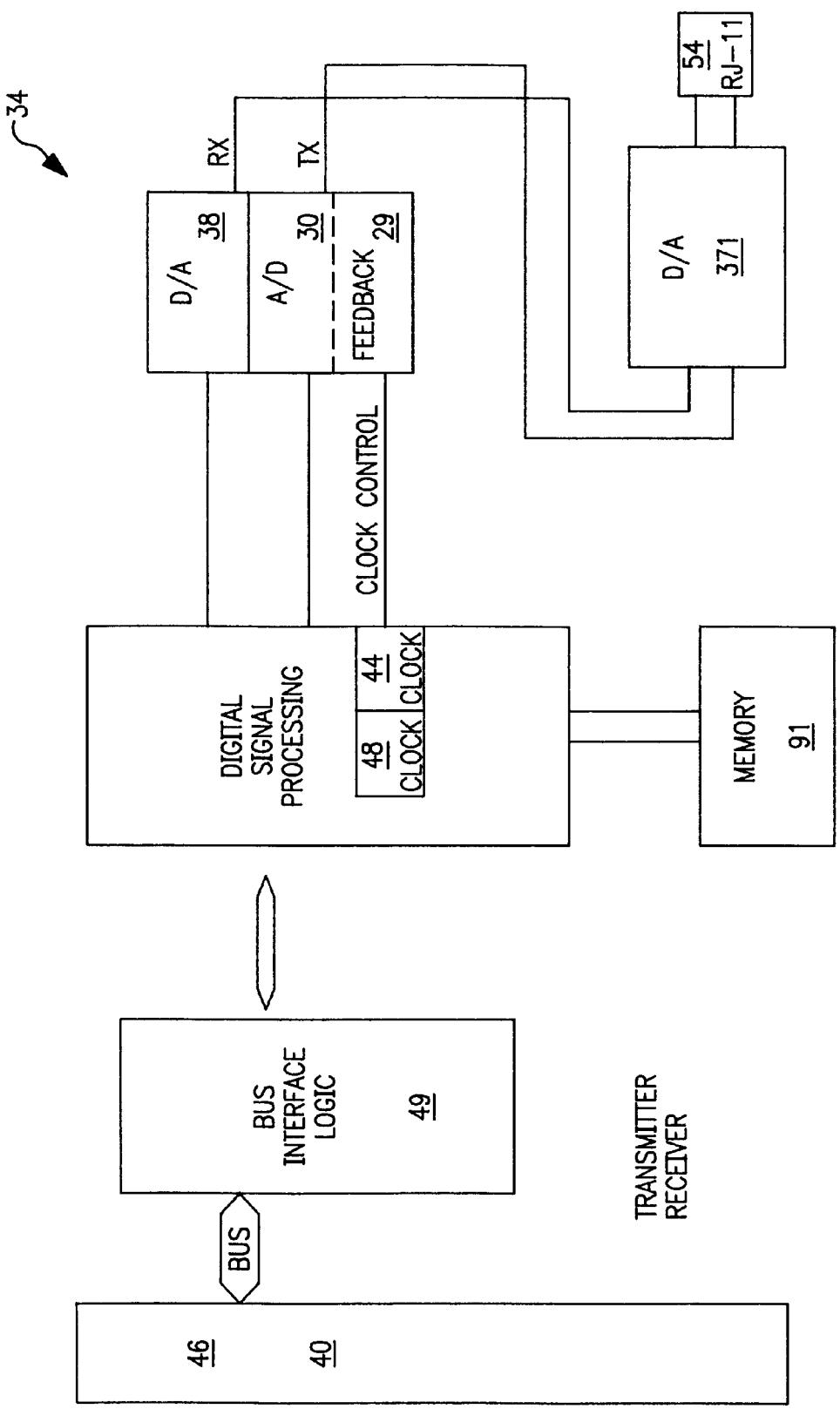
FIG. 6 is a block diagram showing circuit components according to an embodiment of the user station of this invention.

FIG. 6 is a block diagram showing circuit components of the host 34 according to an embodiment of the host of this invention wherein each component is presented in detail in FIGS. 7–12.

There are shown the receiver section 40 and transmitter section 46 connected through bus and logic section 49 to the digital processing section containing clocks 48 and 44. The digital processing section is connected to the D/A section 38, A/D sections 30, and feedback section 29 which transceive the signals through D/A 371 to the central station.

There is shown a connector RJ-11 connector 54 which connects the host 34 to the central station 22 (central station not shown in FIG. 6).

Figures 1, 7:
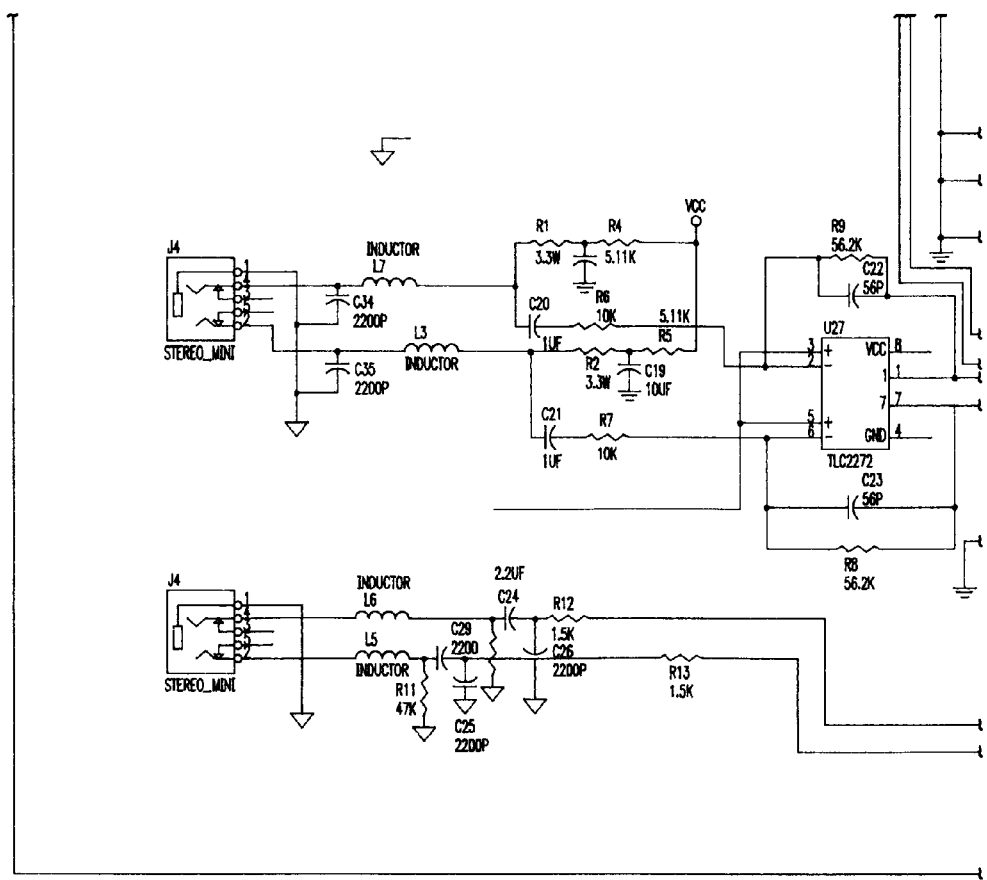
FIG. 7 shows details of the D/A and A/D converters.
Figures 2, 7:
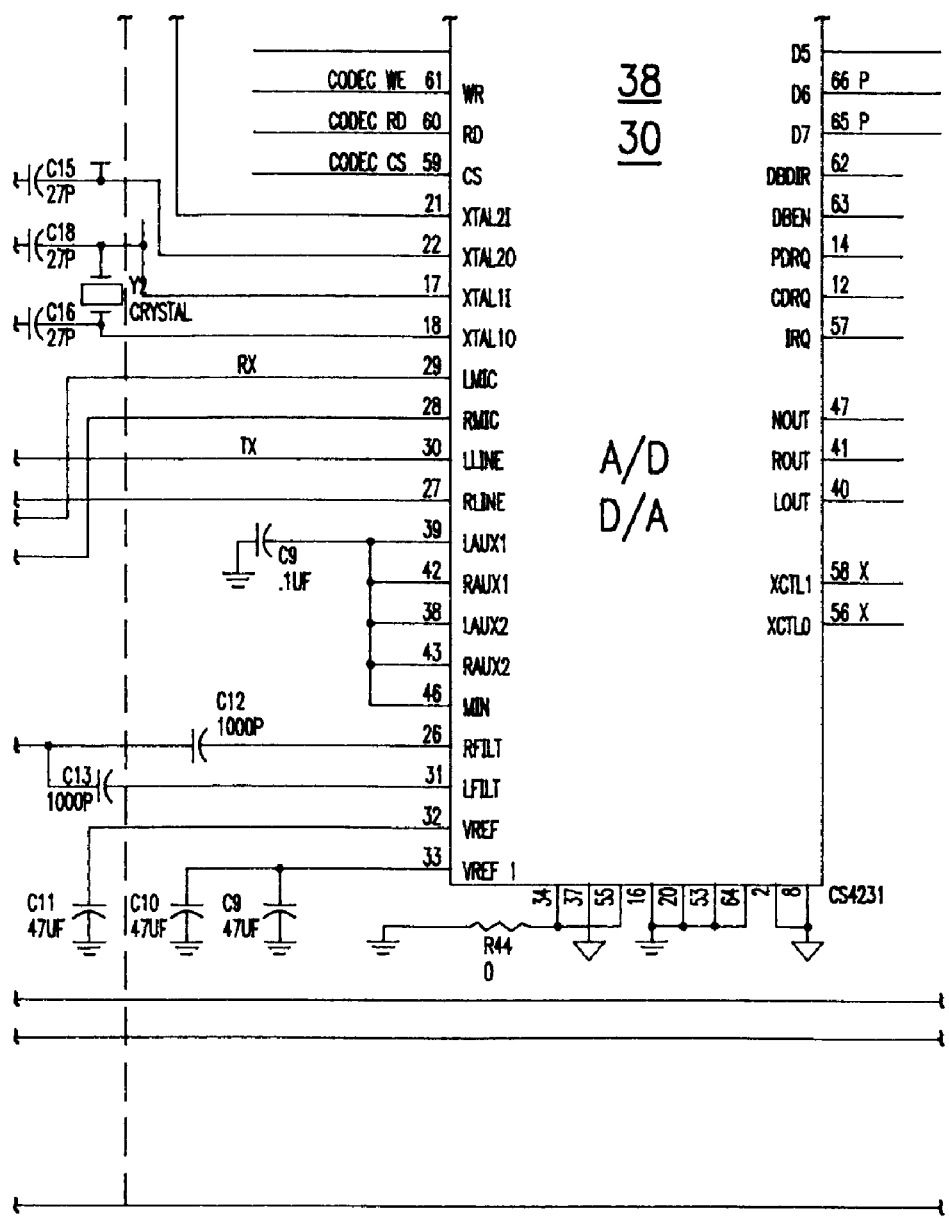

FIG. 7 shows details of the D/A and A/D converters.

Figure 8:
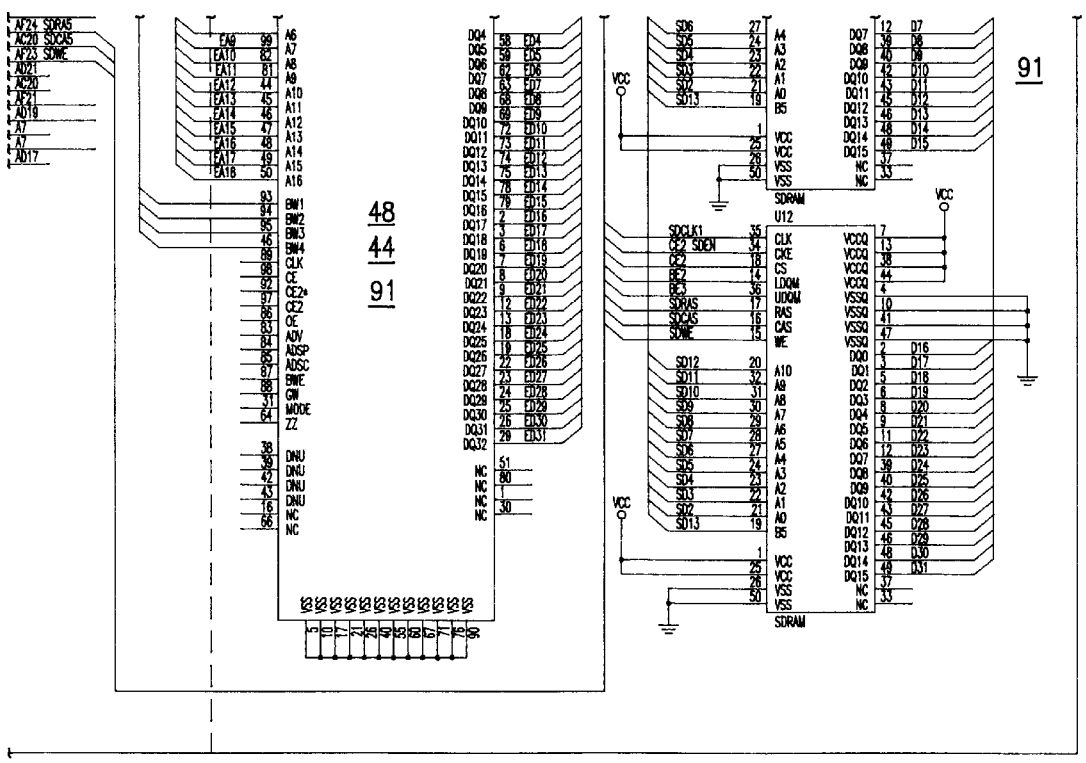
FIG. 8 shows details of the digital processing section, transmit and receive clocks.

FIG. 8 shows details of the digital processing section, transmit and receive clocks.

Figures 2, 9:
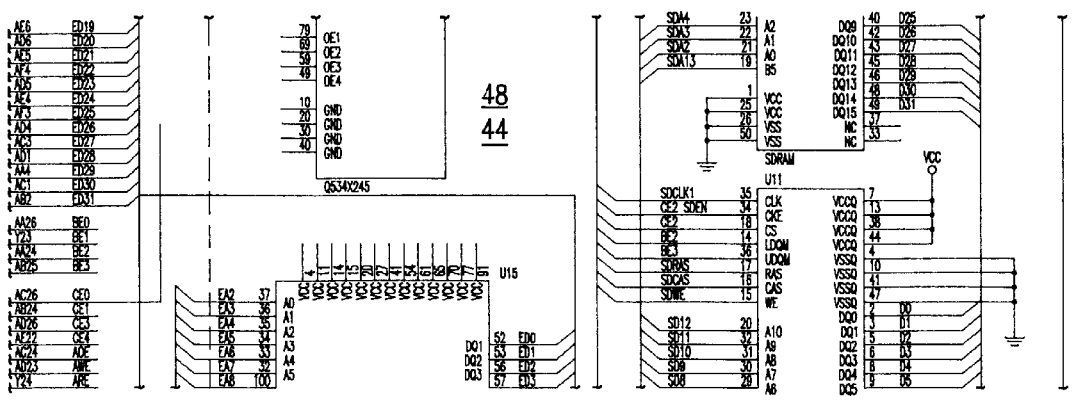
FIG. 9 shows details of the memory.

FIG. 9 shows details of the memory.

Figures 1, 10:
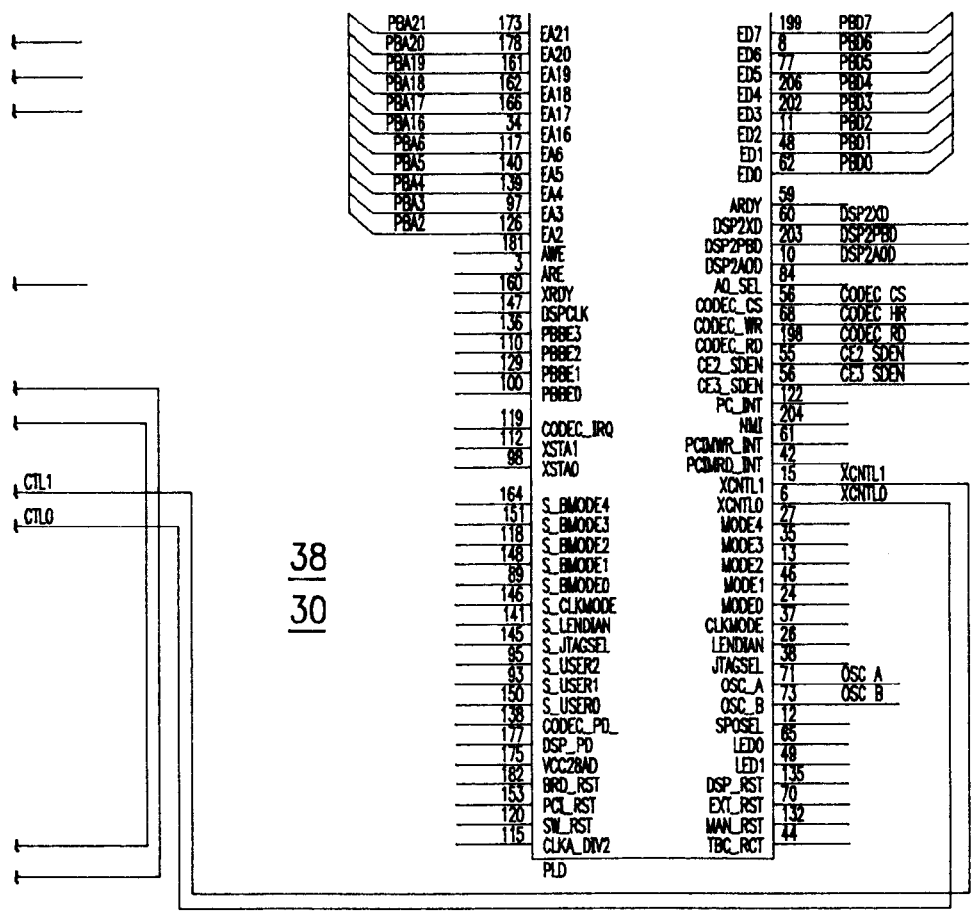
FIG. 10 shows additional details of the D/A and A/D converters and data processing section.
Figures 2, 10:
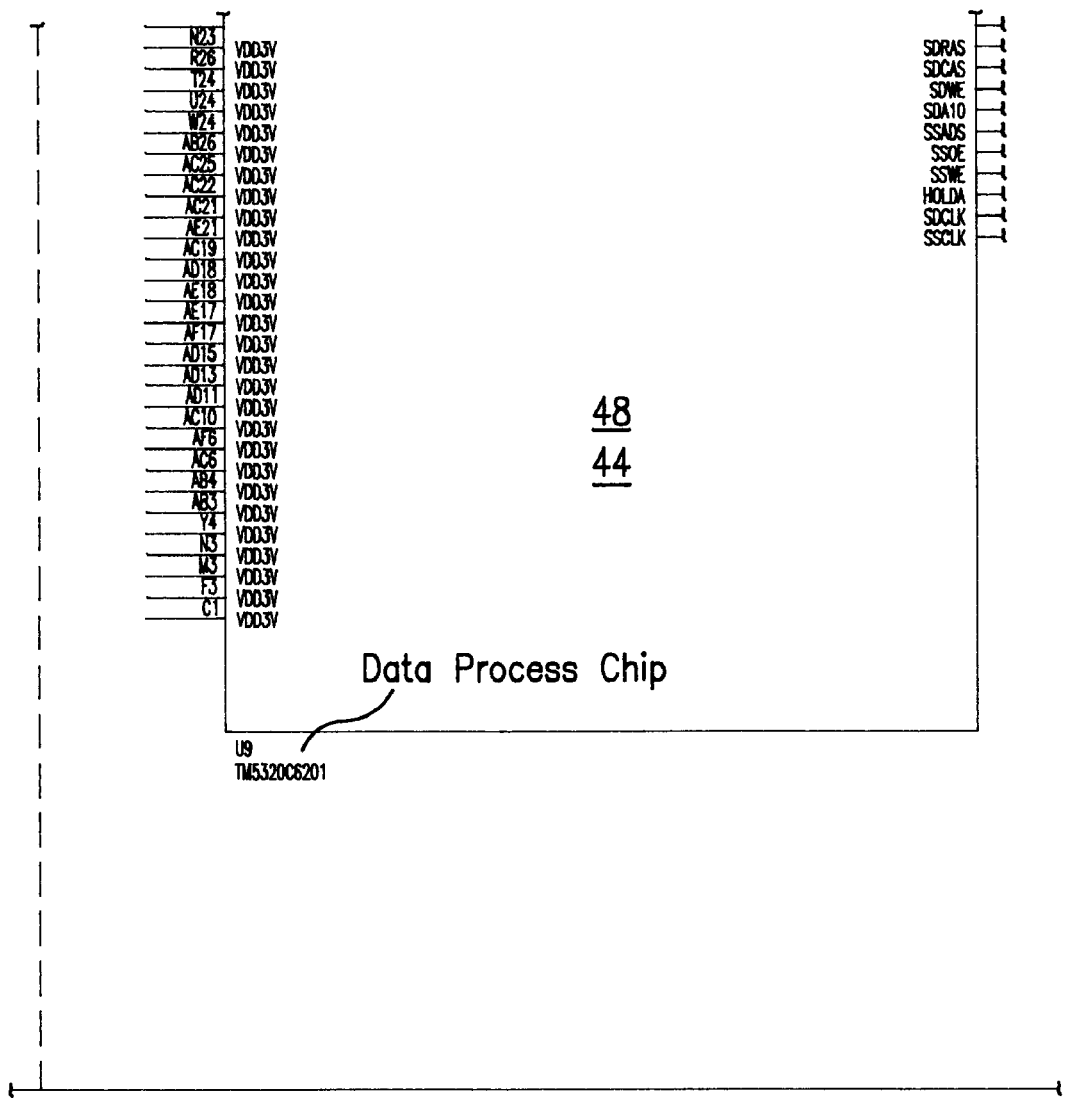

FIG. 10 shows additional details of the D/A and A/D converters and data processing section.

Figure 11:
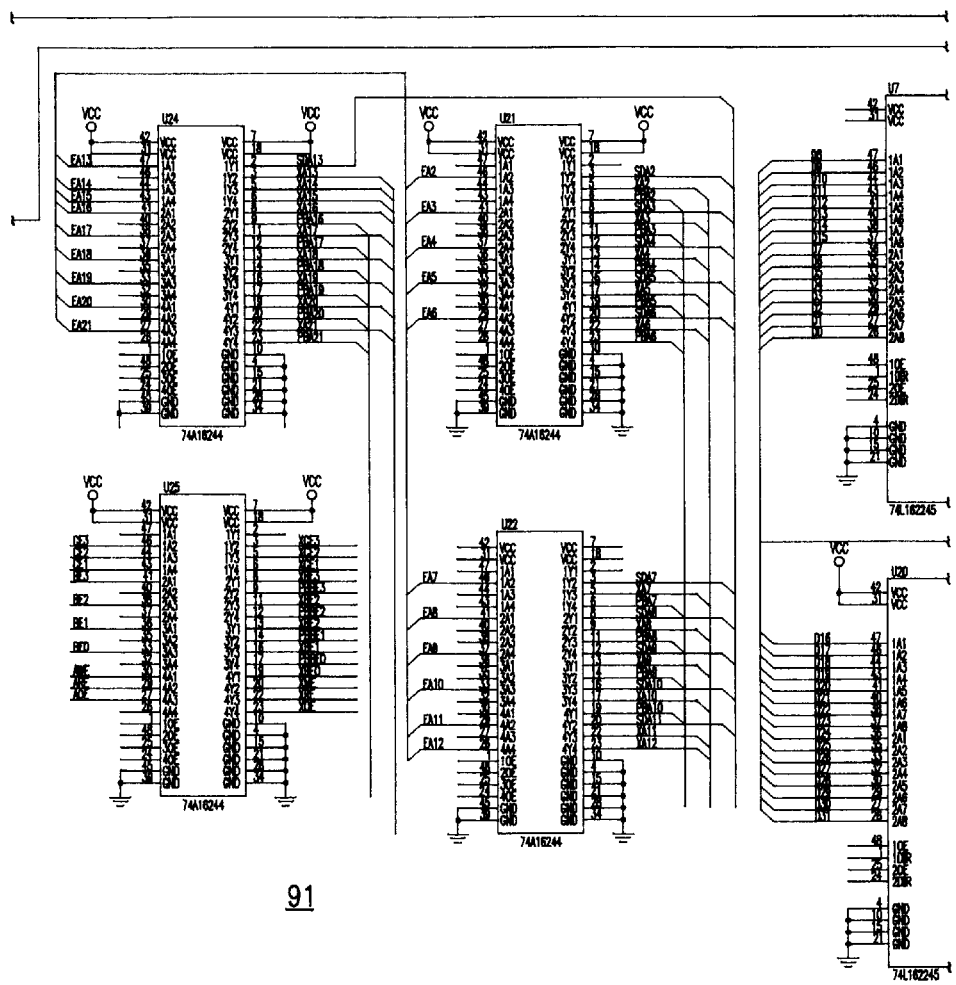
FIG. 11 shows details of the bus interface logic with the computer, memory, digital signal processor, the D/A and A/D converters.
Figure 2:
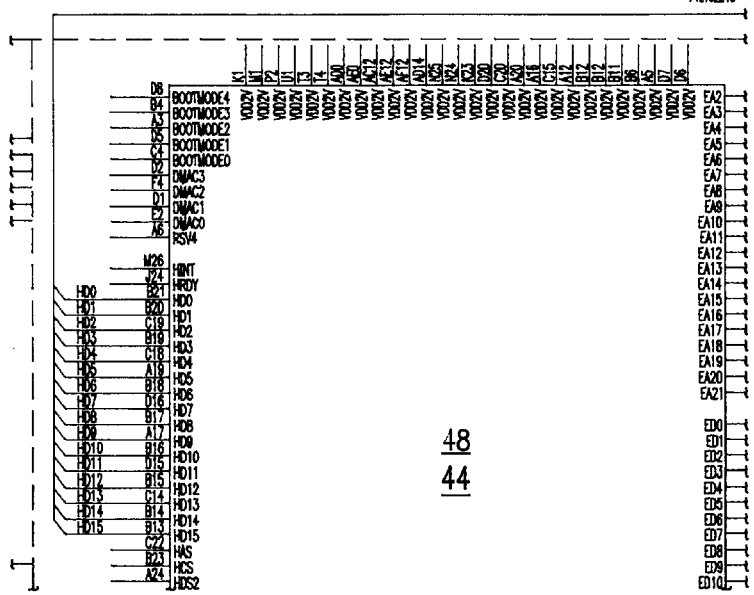
Figures 3, 11:
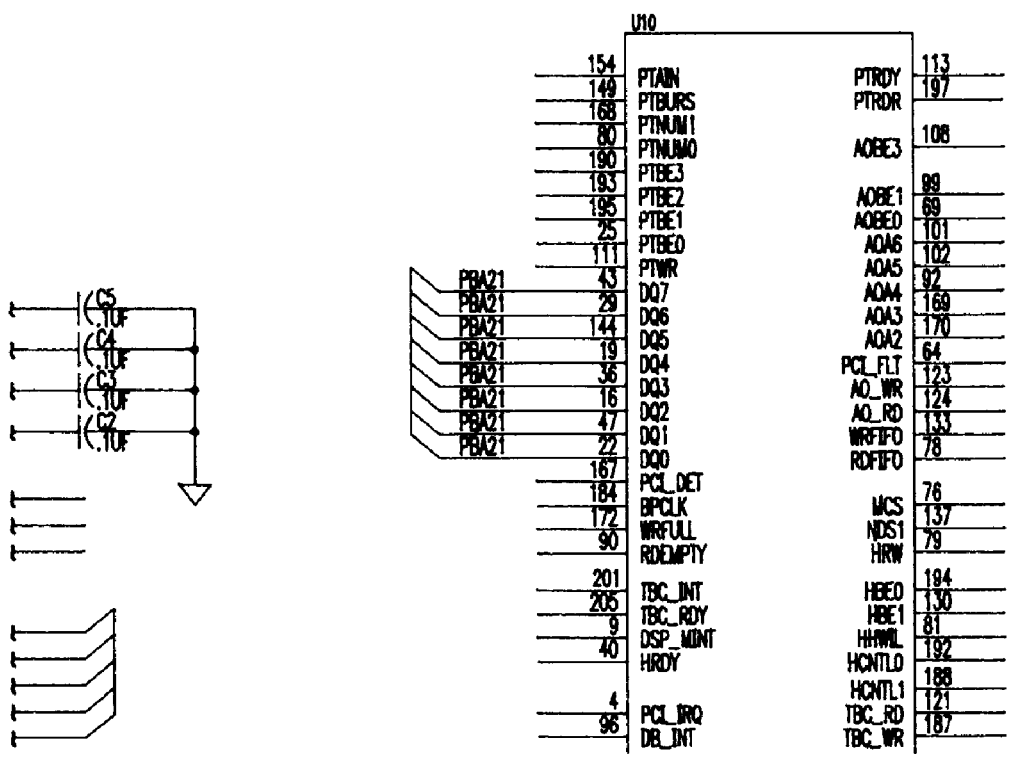
Figures 4, 11:
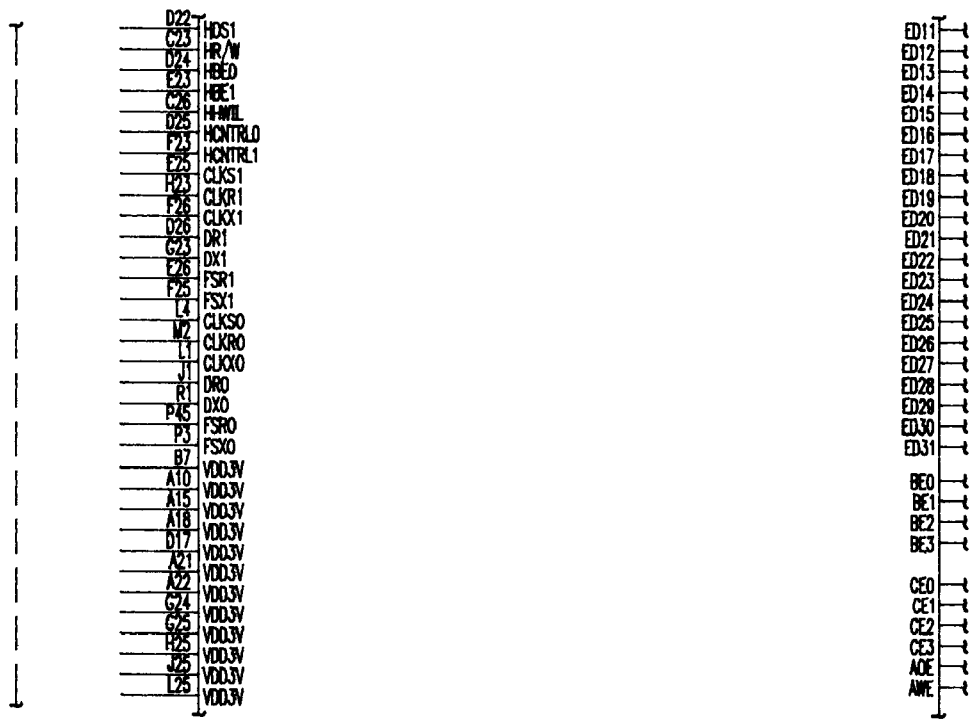

FIG. 11 shows details of the bus interface logic with the computer, memory, digital signal processor, the D/A and A/D converters.

Figures 1, 12:
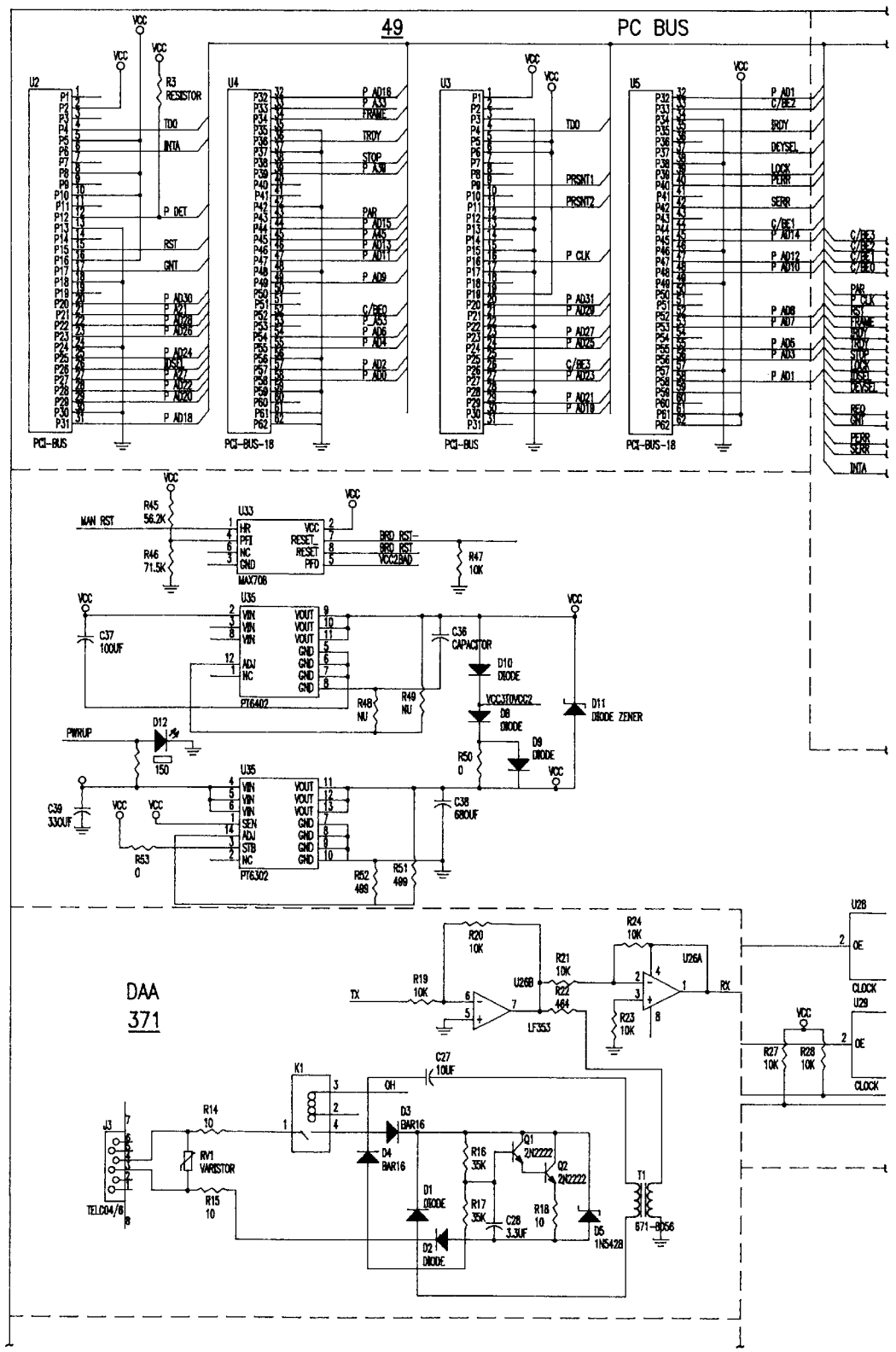
FIG. 12 shows details of the data access arranger, the bus connection to the personal computer, and the D/A and A/D converters.
Figures 2, 12:
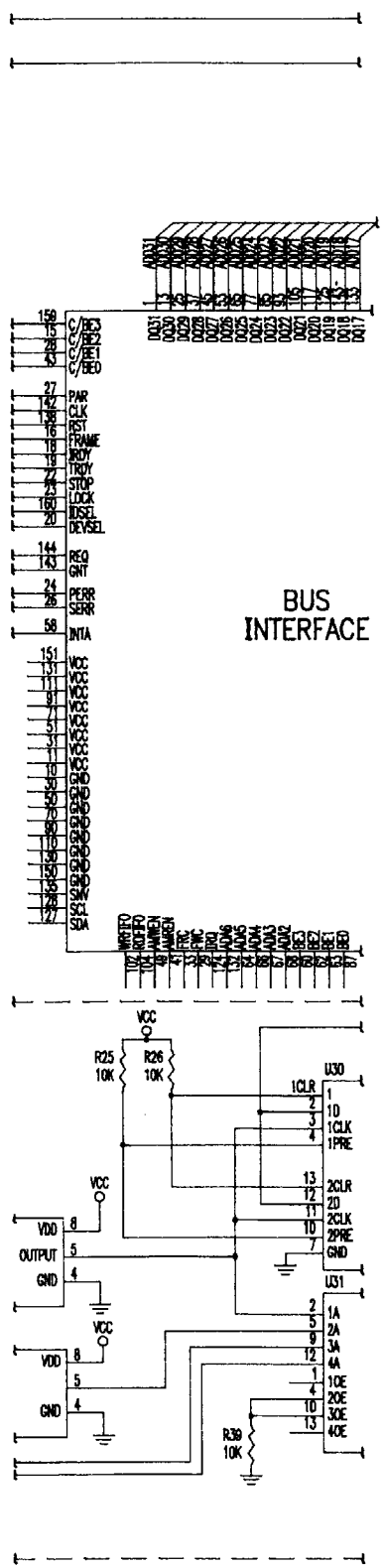
Figures 3, 12:
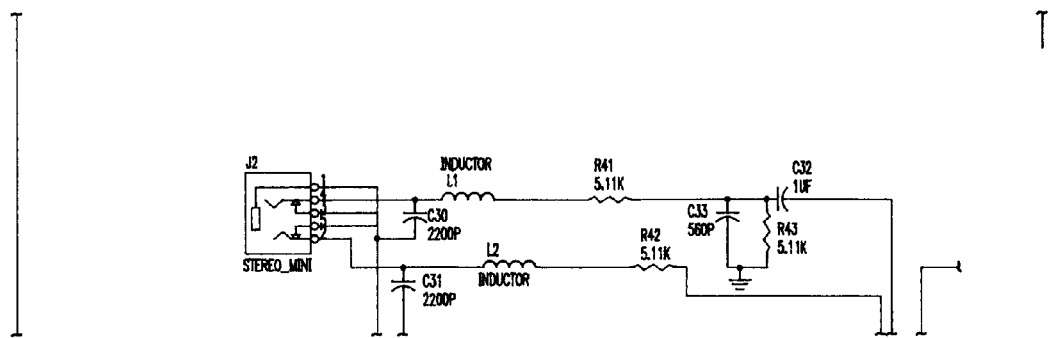
Figures 4, 12:
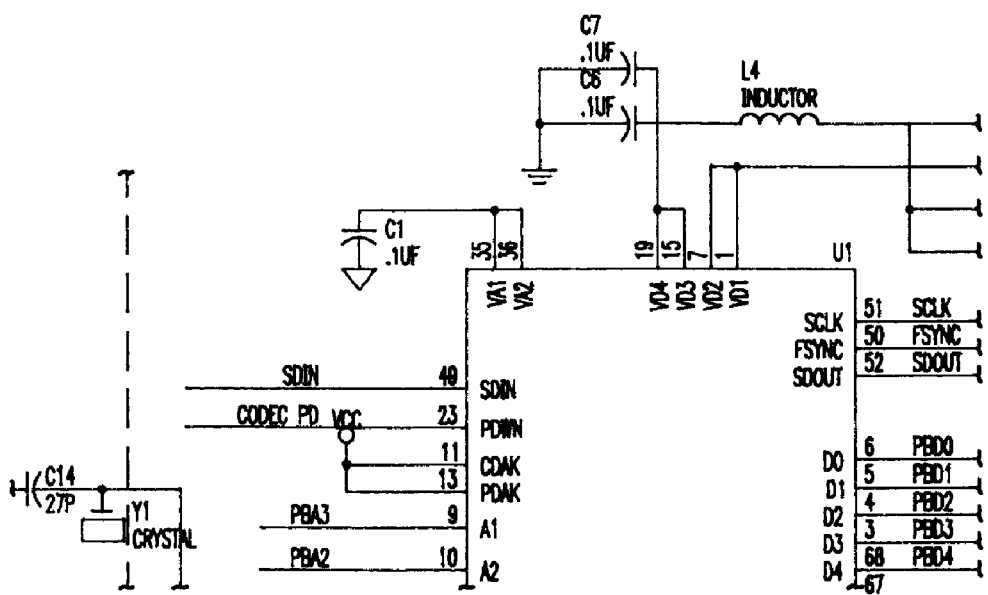

FIG. 12 shows details of the data access arranger, the bus connection to the personal computer, and the D/A and A/D converters.

There has been described a method and circuits for communication between two or more hosts using a central station. In one arrangement the two communicating hosts are connected to the central station through PSTN lines. In another embodiment of the invention, one host is connected to the central station through a PSTN line and another host is connected to the central station by a digital T-1 connection.

Variations and modifications of the invention may be suggested by reading the drawings and studying the specifications that are within the scope of the invention i therefore wish to define the scope of my invention by the appended claims.

I claim:

1. A system for communication between a first host having a modem and a respective computer and a second host having another modem and another respective computer wherein each modem is connected by a PSTN line to a central station, each first and second hosts respectively comprising:

a D/A converter means connected to said respective computer and central station for converting an outgoing digital signal from said respective computer to an outgoing analog signal for transmission to said central station;

an A/D converter means connected to said respective computer for converting an incoming analog signal received from said central station to an incoming digital signal delivered to said respective computer;

said incoming and outgoing analog signals each being a succession of amplitudes at a sampling rate;

said incoming and outgoing digital signals being a succession of groups of bits;

a transmit clock connected to said D/A converter means to control rate of conversion of said groups of bits of said outgoing digital signal to corresponding amplitudes of said first analog signal at said sampling rate;

a receive clock connected to said A/D converter means to control rate of conversion of said amplitudes of said incoming analog signal to corresponding groups of bits of said second digital signal at said sampling rate;

means for synchronizing said transmit clock and receive clock of said modem with a clock signal from said central station, said clock signal having said sampling rate;

said modem having a feedback means for suppressing reflected analog signals from said central station enabling said first host in operable combination with said second host and central station to communicate digital signals in fill duplex mode.

2. The system of claim 1 wherein said means for synchronizing said transmit clock with said clock timing signal from said central station comprises:

means for measuring amplitude of said clock timing signal when a clock pulse of said transmit clock of said modem is maximum;

means for adjusting phase of clock signal of said transmit clock of said modem relative to said clock timing signal to where said measured amplitude of said clock timing signal is maximum.

3. The system of claim 1 wherein said D/A converter means comprises:

a buffer arranged to temporarily store each group of bits received from said respective computer;

transmit lookup table listing an analog value for each amplitude of a plurality of amplitudes, each amplitude representing a value of one of said groups of bits;

a processor means for applying each group of bits stored in said buffer to said transmit lookup table and reading a corresponding analog value to construct said analog signal, said transmit clock operably combined with said processor for controlling rate of applying each group of bits stored in said buffer to said transmit lookup table and reading said corresponding analog value to construct said analog signal.

4. The system of claim 1 wherein said AID converter means comprises:

a receive lookup table listing digital values, each digital value corresponding to a possible amplitude value of said analog signal;

processor means for applying each amplitude of a series of amplitudes of said analog signal incoming from said central station to said receive lookup table and outputting a group of bits corresponding to a digital representation of each amplitude;

a buffer arranged to store temporarily said group of bits received from said processor means;

said receive clock arranged to control said buffer to output said group of bits to said respective computer at a rate corresponding to said sampling rate.

5. The system of claim 1 wherein said PSTN line has a bandwidth defined by a maximum frequency and said sampling rate is equal to about twice said maximum frequency.

6. The system of claim 5 wherein said bandwidth is about 4000 hz.

7. The system of claim 1 wherein said means for synchronizing comprises:

said transmit clock transmitting a clock signal to said central station;

said transmit clock enslaved to said receive clock respectively;

said receive clock being a slave to a transmit clock and a receive clock of a computer sending said incoming signal;

said computer sending said incoming signal being a slave to said transmit clock of said said computer sending said outgoing signal;

said transmit clock of said computer sending said outgoing signal and said transmit clock of said computer sending said outgoing signal each emitting said clock timing signal at said sampling rate by default when said one of said transmit clocks initiates said communication.

8. The system for communication of claim 1 further comprising:

said central station coupled to said modem through a PSTN line and to said second computer through a digital connection;

said central station having a receive clock and a transmit clock wherein said receive clock of said central station is enslaved to said transmit clock of said central station;

said transmit clock of said central station arranged to transmit said clock timing signal to said modem providing that said transmit clock and receive clock of said modem are synchronized with said transmit clock of said central station.

9. The system of claim 8 wherein said PSTN line has a transmission bandwidth defined by a maximum frequency and said sampling rate is about twice said maximum frequency.

10. The system of claim 1 wherein said PSTN line has a transmission bandwidth defined by a maximum frequency and said sampling rate is about twice said maximum frequency.

11. A system for communication of claim 1 further comprising:

a plurality of groups consisting of a computer coupled to a respective modem;

each said respective modem having a receive clock;

said central station coupled through a PSTN line to each modem of one group of said plurality of groups;

said central station coupled through a digital T-1 connector to each modem of another group of said plurality of groups;

said central station having a receive clock and a transmit clock wherein said receive clock of said central station is enslaved to said transmit clock of said central station;

said receive clock of said central station operably arranged to clock digital signals received from said another group connected to said central station through said T-1 connectors.

12. A modem for communication between one computer and another computer through a central station having a PSTN line, said PSTN line having a transmission bandwidth defined by a maximum frequency said modem comprising:

a D/A converter means adapted for connection to the central station and one of the one computer and another computer, for converting an outgoing digital signal from said computer to an outgoing analog signal for transmission to said central station;

an A/D converter means adapted for connection to one of the one computer and another computer, for converting an incoming analog signal received from said central station to an incoming digital signal delivered to the respective computer;

said incoming and outgoing analog signals each being a succession of amplitudes at a sampling rate;

said incoming and outgoing digital signals being a succession of groups of bits;

a transmit clock connected to said D/A converter means to control rate of conversion of said groups of bits of said outgoing digital signal to corresponding amplitudes of said outgoing analog signal at said sampling rate;

a receive clock connected to said A/D on converter means to control rate of conversion of said amplitudes of incoming analog signal to corresponding groups of bits of said incoming digital signal at said sampling rate;

said transmit clock of said one computer and said transmit clock of said another computer each transmitting a clock signal to said central station;

said transmit clock of said one computer and said transmit clock of said another computer each enslaved to said receive clock of said one computer and said receive clock of said another computer respectively;

said receive clock of said one computer being a slave to said transmit clock of said another computer and said receive clock of said another computer being a slave to said transmit clock of said one computer;

one of said transmit clock of said one computer and another computer emitting said clock timing signal at said sampling rate by default when said one of said transmit clocks initiates said communication;

said modem having a feedback means for suppressing reflected analog signal from said central station enabling said first computer in operable combination with said another computer and central station to communicate digital signals in final duplex mode;

said sampling rate equal to about twice said maximum frequency.

13. The modem of claim 12 wherein said means for synchronizing said transmit clock with said clock timing signal from said central station comprises:

means for measuring amplitude of said clock timing signal when a clock pulse of said transmit clock of said modem is maximum;

means for adjusting phase of clock signal of said transmit clock of said modem relative to said clock timing signal to where said measured amplitude of said clock timing signal is maximum.

14. The modem of claim 12 wherein said D/A converter means comprises:

a buffer arranged to temporarily store each group of bits received from said respective computer;

a transmit lookup table listing amplitudes, each amplitude corresponding to one of said groups of bits;

a processor means for applying each group of bits stored in said buffer to said transmit lookup table and reading said corresponding analog value to construct said analog signal, said transmit clock operably combined with said processor for controlling rate of applying each group of bits stored in said buffer to said transmit lookup table and reading said corresponding analog value to construct said analog signal.

15. The modem of claim 12 wherein said A/D converter means comprises:

a receive lookup table listing digital values, each digital value corresponding to a possible amplitude value of said analog signal;

processor means for applying each amplitude of said series of amplitudes of said analog signal incoming from said central station to said receive lookup table and outputting a group of bits corresponding to a digital representation of each amplitude;

a buffer arranged to store temporarily said group of bits received from said processor means;

said receive clock arranged to control said buffer to output said group of bits to said respective computer at a rate corresponding to said sampling rate.

* * * * *